United States Patent [19]

Baxter

[11] Patent Number: 4,675,051

[45] Date of Patent: Jun. 23, 1987

[54] MARINE ANTI-FOULING PAINT

[75] Inventor: Kenneth F. Baxter, Sunderland, United Kingdom

[73] Assignee: International Paint Public Limited Company, United Kingdom

[21] Appl. No.: 857,126

[22] Filed: Apr. 29, 1986

[30] Foreign Application Priority Data

May 2, 1985 [GB] United Kingdom ................ 8511144

[51] Int. Cl.$^4$ .............................................. C09D 3/40
[52] U.S. Cl. ................................... 106/16; 106/18.32
[58] Field of Search ............. 106/15.05, 16, 17, 18.32; 260/102

[56] References Cited

U.S. PATENT DOCUMENTS

| | | | |
|---|---|---|---|
| 2,750,366 | 6/1956 | Turinsky | 260/102 |
| 3,778,394 | 12/1973 | Lovald et al. | 260/18 |
| 4,219,382 | 8/1980 | Leffler | 162/180 |
| 4,270,953 | 6/1981 | Nakagawa et al. | 106/16 |

OTHER PUBLICATIONS

"Marine Fouling and Its Prevention" by Woods Hole Oceanographic Institution, Chapter 17, pp. 302 and 312.
"Recommended Practice for the Protection and Painting of Ships" by The British Ship Research Association, 1983, pp. 261 & 262.

*Primary Examiner*—Lorenzo B. Hayes
*Attorney, Agent, or Firm*—Steele, Gould & Fried

[57] ABSTRACT

A marine anti-fouling paint which is gradually dissolved in sea water comprises a binder which is a resin produced by the reaction of rosin and an aliphatic polyamine containing at least one primary or secondary amine group. The resin contains an amidoamine or imidazoline group. The anti-fouling paint comprises the binder, a marine biocide and a pigment having a solubility in sea water of not more than 10 parts per million by weight. The pigment may itself be the marine biocide of the paint.

12 Claims, No Drawings

MARINE ANTI-FOULING PAINT

FIELD OF THE INVENTION

This invention relates to a marine anti-fouling paint generally used as a top coat paint for ships' hulls.

BACKGROUND OF THE INVENTION

The growth of marine organisms on the submarine parts of a ship's hull increases the frictional resistance of the hull to passage through water, leading to increased fuel consumption and a reduction in the speed of the ship. Marine growths such as barnacles and algae accumulate so rapidly that the remedy of cleaning and repainting as required is impractical. In general, fouling by marine organisms is limited by applying to the hull a top coat of a paint which releases a biocide for the marine organisms. Traditionally such paints have comprised a relatively inert binder with a biocidal pigment which is leached from the paint. The main binders which have been used are vinyl resins, particularly a vinyl chloride/vinyl acetate copolymer, and rosin. The vinyl resins are sea-water-insoluble and paints based on them use a high pigment concentration so that there is contact between pigment particles to ensure leaching. Rosin is a hard brittle resin which is very slightly soluble in sea water. The biocidal pigment is gradually leached out of the matrix of rosin binder in use, leaving a skeletal matrix of rosin which becomes washed off the hull surface in thin flakes to allow leaching of the biocidal pigment from deeper within the paint film. Examples of rosin anti-fouling paints are described at pages 261 and 262 of the book "Recommended Practice for the Protection and Painting of Ships" published by the British Ship Research Association in 1973. Leaching of the biocidal pigment leaves an irregular layer of binder from which the pigment has been leached so that the roughness of the hull surface gradually increases in use.

The most successful paints in recent years have been the "Self-polishing copolymer" paints based on a polymeric binder to which biocidal triorganotin moieties are chemically bound and from which the biocide moieties are gradually hydrolysed by sea water, as described for example in British Pat. No. 1,457,590. This generates a water-soluble resin which is gradually dissolved from the hull surface by the movement of the ship in service. This gradual dissolution allows the painted hull to at least retain its initial smoothness and even to become smoother in service. Moreover, the gradual dissolution means that a fresh anti-fouling paint surface is continuously revealed, prolonging the time for which biocide release at the paint surface is maintained above the lethal concentration. However, there has recently been concern about the environmental effect of triorganotin biocides released from yachts in particular and there is a demand for a marine paint which dissolves smoothly in water without necessarily releasing triorganotin moieties.

SUMMARY OF THE INVENTION

A marine anti-fouling paint according to the invention comprises a film-forming binder which is gradually dissolved in sea water, a marine biocide and a pigment having a solubility in sea water of not more than 10 parts per million by weight and is characterised in that the binder is a resin produced by the reaction of rosin and an aliphatic polyamine containing at least one primary or secondary amine group. The pigment may itself be the marine biocide of the paint.

DETAILED DESCRIPTION

Rosin is a carboxylic-acid-functional blend of terpene materials whose major component is abietic acid of the formula $C_{19}H_{29}COOH$. Rosin containing a high proportion of abietic acid is preferred, for example that sold commercially as WW Rosin. Alternatively, maleinised rosin and fumarised rosin can be used. Maleinised or fumarised rosin has two more carboxylic acid groups per terpene molecule than the rosin from which it is derived. Rosin materials of intermediate acid value can be prepared by partially esterifying maleinised or fumarised rosin with an alcohol, for example to esterify one carboxylic acid group per molecule.

The aliphatic polyamine is preferably of the formula $H_2N(RNH)_nR'$; where R is an alkylene group containing 2 to 4 carbon atoms, for example ethylene, 1,2-propylene, 1,3-propylene, 1,2-butylene or 1,4-butylene, R' is hydrogen or an alkyl or hydroxy alkyl group containing 1 to 3 carbon atoms, for example a methyl or hydroxyethyl group and n equals 1 to 6. Examples of preferred polyamines are ethylene diamine, diethylene triamine, triethylene tetramine, tetraethylene pentamine, pentaethylene hexamine, N-methyl ethylene diamine and N-hydroxyethyl ethylene diamine. Alternatively the polyamine may contain one or more ether linkages, for example a polyoxyethylene diamine can be used such as one of those sold under the trade mark 'Jeffamine'.

The reaction product of the rosin and polyamine may be mainly an amido amine according to the reaction:

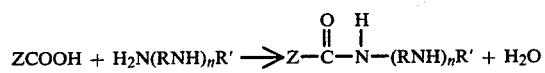

where Z is a terpene residue, substantially of the empirical formula $C_{19}H_{29}$, or, when R is ethylene or a 1,2-alkylene group, an imidazoline according to the reaction:

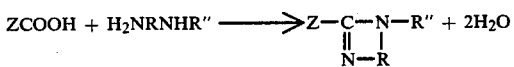

where R" has the formula $(RNH)_mR'$, m being 0 to 5, or a mixture of amido amine and imidazoline.

The reaction between the rosin and polyamine is preferably carried out at 60°–150° C. The reaction may be carried out in excess polyamine or in an organic solvent, for example an aromatic hydrocarbon such as xylene or toluene, an aliphatic hydrocarbon such as white spirit, an ester such as butyl acetate or ethoxy ethyl acetate, an alcohol such as butanol or butoxyethanol or a ketone such as methyl isobutyl ketone or methyl isoamyl ketone. Reaction temperatures of at least 100° C. are preferred if it is desired to form imidazoline groups, preferably with removal of water, for example by azeotropic distillation. Production of amido amine is optimised by terminating the reaction after removal of about one mole of water per mole of polyamine introduced. Production of imidazoline is optimised in appropriate cases by continuing the reaction until about two moles of water have been removed per mole of polyamine introduced.

The reaction products of the rosin and polyamine are more flexible polymers than rosin and have slightly increased solubility in sea water compared to the rosin from which they are formed. Paints based on them are smoothly dissolved from a ship's hull in service and allow a steady release of the biocide in the paint.

The paint binder is mixed with the biocide component of the paint and the pigment or pigments used in the paint. Conventional blending procedures can be used. The pigment is preferably a sparingly soluble pigment having a solubility in sea water of from 0.5 to 10 parts per million by weight, for example cuprous oxide, cuprous thiocyanate, zinc oxide, zinc chromate, zinc ethylene bis(dithiocarbamate), zinc dimethyl dithiocarbamate or zinc diethyl dithiocarbamate. These sparingly soluble copper and zinc compounds are generally marine biocides. These pigments produce water-soluble metal compounds on reaction with sea water so that the pigment particles do not survive at the paint surface. Mixtures of sparingly soluble pigments can be used, for example cuprous oxide, cuprous thiocyanate or zinc ethylene bis(dithiocarbamate) which are the most effective biocidal pigments can be mixed with zinc oxide which dissolves slightly more rapidly in sea water.

The paint composition can additionally or alternatively contain a pigment which is not reactive with sea water and may be highly insoluble in sea water (solubility below 0.5 ppm by weight) such as titanium dioxide or ferric oxide. Such highly insoluble pigments are preferably used in proportions up to 40 per cent by weight of the total pigment component of the paint, most preferably less than 20 per cent by weight.

The proportion of pigment to resin binder is preferably such as to give a pigment volume concentration which is above 25 per cent in the dry paint film but below the critical pigment volume concentration; most preferably the pigment volume concentration is from 35-50 per cent.

The paint composition may contain a plasticiser, for example a poly(vinyl methyl ether) or a substituted sulphonamide such as N-ethyl p-toluene sulphonamide.

The biocidal effect of the sparingly sea-water-soluble pigments, particularly cuprous oxide, cuprous thiocyanate and zinc ethylene bis(dithiocarbamate) may be sufficient so that the paint needs no further biocide. For encountering severe fouling the paint may contain an added biocide. Triorganotin salts and oxides such as triphenyltin fluoride, tributyltin fluoride, tributyltin dibromosuccinate, triphenyltin chloride, triphenyltin hydroxide and tributyltin oxide are effective marine biocides and can be used in paints according to the invention. A paint according to the invention comprising a triorganotin salt (up to 25 per cent by volume of the pigments) may have anti-fouling and smoothing properties equal to a triorganotin copolymer paint of much higher triorganotin content. In some cases it will be desired to avoid completely the release of triorganotin ions. Examples of other biocides effective as marine antifouling agents are dithiocarbamate derivatives such as cuprous ethylene bis(thiocarbamate) or tetramethyl thiuram disulphide, methylene bis(thiourea), 4-butyl catechol and captan.

The invention is illustrated by the following Examples, in which parts are by weight unless otherwise stated:

EXAMPLE 1

WW grade rosin was reacted with an equimolar amount (assuming the rosin to be abietic acid) of N-hydroxyethyl ethylehe diamine in xylene at 100° C. with removal of water by azeotropic distillation. Heating was discontinued after 40 minutes when the amount of water removed was approximately equivalent to one mole per mole of diamine, corresponding to the formation of a reaction product comprising mainly amido amine.

A portion of the resin solution produced comprising 20.0 parts rosin/polyamine reaction product in 13.0 parts xylene was milled with 52.0 parts cuprous oxide, 1.55 parts anti-settling agents and 13.45 parts white spirit to produce a marine anti-fouling paint having a pigment volume concentration of 35 per cent.

EXAMPLE 2

WW grade rosin and N-hydroxyethyl ethylene diamine were reacted in the same proportions as in Example 1 in xylene at 120° C. for an hour. The amount of water removed was nearly 2 moles per mole of diamine corresponding to the formation of a reaction product comprising mainly imidazoline-substituted rosin.

A marine anti-fouling paint was prepared using the formulation of Example 1 but with the imidazoline reaction product of Example 2 in place of the amido amine reaction product of Example 1.

EXAMPLES 3 AND 4

The process of Example 1 was repeated using equimolar amounts of pentaethylene hexamine (Example 3) or triethylene tetramine (Example 4) in place of N-hydroxyethyl ethylene diamine to prepare an amido amine reaction product. In each case marine paints were prepared from the reaction product as described in Example 1.

I claim:

1. A marine anti-fouling paint comprising a binder which is gradually dissolved in sea water, a marine biocide and a pigment having a solubility in sea water of not more than 10 parts per million by weight, said binder being a resin produced by the reaction of rosin and an aliphatic polyamine containing at least one primary or secondary amine group.

2. A paint according to claim 1, in which the aliphatic polyamine is of the formula: $H_2N(RNH)_nR'$ where R is an alkylene group containing 2 to 4 carbon atoms, R' is hydrogen or an alkyl or hydroxyalkyl group containing 1 to 3 carbon atoms and n equals 1 to 6.

3. A paint according to claim 2, in which R in the formula of the aliphatic polyamine is a —$CH_2CH_2$— group.

4. A paint according to claim 1, in which the pigment is selected from the group consisting of sparingly soluble copper and zinc compounds having a solubility in sea water of from 0.5 to 10 parts per million by weight and also constitutes the marine biocide of the paint.

5. A paint according to claim 4, in which the pigment is selected from the group consisting of cuprous oxide, cuprous thiocyanate and zinc ethylene bis(dithiocarbamate).

6. A marine anti-fouling paint comprising a binder which is gradually dissolved in sea water, a marine biocide and a pigment having a solubility in sea water of not more than 10 parts per million by weight, said binder being an amidoamine derived from rosin and consists at least predominantly of material of the formula:

$$Z-\overset{O}{\overset{\|}{C}}-\overset{H}{\overset{|}{N}}-(RNH)_nR$$

where Z is a terpene residue substantially of the empirical formula $C_{19}H_{29}—$, R is an alkylene group containing 2 to 4 carbon atoms, R' is hydrogen, an alkyl or hydroxyalkyl group containing 1 to 3 carbon atoms and n equals 1 to 6.

7. A marine anti-fouling paint comprising a binder which is gradually dissolved in sea water, a marine biocide and a pigment having a solubility in sea water of not more than 10 parts per million by weight, said binder being an imidazoline derived from rosin and consists at least predominantly of material of the formula $$\begin{array}{c} Z-C\!\!-\!\!-\!\!-N-R' \\ \| \quad\quad | \\ N \quad\quad CH_2 \\ \diagdown \diagup \\ CH_2 \end{array}$$

where Z is a terpene residue substantially of the empirical formula $C_{19}H_{29}—$ and R'' is a group of the formula $$-(CH_2CH_2NH)_mR'$$

wherein R' is hydrogen, an alkyl or hydroxyalkyl group containing 1 to 3 carbon atoms and m equals 0 5.

8. A paint according to claim 6, in which the pigment is selected from the group consisting of sparingly soluble copper and zinc compounds having a solubility in sea water of from 0.5 to 10 parts per million by weight and also constitutes the marine biocide of the paint.

9. A paint according to claim 7, in which the pigment is selected from the group consisting of sparingly soluble copper and zinc compounds having a solubility in sea water of from 0.5 to 10 parts per million by weight and also constitutes the marine biocide of the paint.

10. A paint according to claim 2 in which the aliphatic polyamine is a diamine of the formula:

$$H_2NR\ NHR'$$

where R and R' are defined as hereinbefore defined.

11. A paint according to claim 6 wherein said binder comprises an amido amine of the formula:

$$Z-\overset{O}{\overset{\|}{C}}-\overset{H}{\overset{|}{N}}-RNHR'$$

where Z, R, and R' are as hereinbefore defined.

12. A paint according to claim 7 wherein said binder comprises an imidazoline group of the formula:

$$\begin{array}{c} Z-C\!\!-\!\!-\!\!-N-(CH_2CH_2NH)_nR' \\ \| \quad\quad | \\ N \quad\quad CH_2 \\ \diagdown \diagup \\ CH_2 \end{array}$$

where Z and R' are as hereinbefore defined and m is 1 to 5.

* * * * *

UNITED STATES PATENT AND TRADEMARK OFFICE
CERTIFICATE OF CORRECTION

PATENT NO. : 4,675,051

DATED : June 23, 1987

INVENTOR(S) : Kenneth F. Baxter

It is certified that error appears in the above-identified patent and that said Letters Patent is hereby corrected as shown below:

Column 4, Line 48 - after "R'" insert -- , --

Column 5, Line 21 - top of diagram -
"R'" should be -- R'' --

Column 6, Line 27 - "nR'" should be -- mR' --.

Signed and Sealed this

Tenth Day of November, 1987

Attest:

DONALD J. QUIGG

*Attesting Officer*  *Commissioner of Patents and Trademarks*